(12) United States Patent
Knuth, Jr. et al.

(10) Patent No.: US 11,537,141 B2
(45) Date of Patent: Dec. 27, 2022

(54) ROBOTIC CLEANING DEVICE WITH DYNAMIC AREA COVERAGE

(71) Applicant: Diversey, Inc., Fort Mill, SC (US)

(72) Inventors: David M. Knuth, Jr., Nonth Chesterfield, VA (US); Aurle Y. Gagne, Mechanicsville, VA (US); Erick Frack, Lake Oswego, OR (US); Daniel M. Daly, Los Gatos, CA (US)

(73) Assignee: Diversey, Inc., Fort Mill, SC (US)

( * ) Notice: Subject to any disclaimer, the term of this patent is extended or adjusted under 35 U.S.C. 154(b) by 258 days.

(21) Appl. No.: 16/720,457

(22) Filed: Dec. 19, 2019

(65) Prior Publication Data

US 2021/0191422 A1 Jun. 24, 2021

(51) Int. Cl.
*G05D 1/02* (2020.01)

(52) U.S. Cl.
CPC ......... *G05D 1/0274* (2013.01); *G05D 1/0219* (2013.01); *G05D 1/0234* (2013.01); *A47L 2201/04* (2013.01); *G05D 2201/0203* (2013.01)

(58) Field of Classification Search
CPC .. G05D 1/0274; G05D 1/0219; G05D 1/0234; G05D 2201/0203; G05D 1/0221; G05D 1/0011; G05D 2201/02; G05D 2201/0208; A47L 2201/04; G01C 21/3804; G01C 21/3811
See application file for complete search history.

(56) References Cited

U.S. PATENT DOCUMENTS

| | | |
|---|---|---|
| 6,667,592 B2 | 12/2003 | Jacobs et al. |
| 8,423,225 B2 | 4/2013 | Hillman, Jr. et al. |
| 8,532,860 B2 | 9/2013 | Daly |
| 8,679,260 B2 | 3/2014 | Hillman, Jr. et al. |
| 8,774,970 B2 | 7/2014 | Knopow et al. |
| 8,958,937 B2 | 2/2015 | Hillman, Jr. et al. |
| 9,014,848 B2 | 4/2015 | Farlow et al. |
| 9,028,617 B2 | 5/2015 | Diversey |
| 9,599,987 B2 | 3/2017 | Tjeerdsma et al. |
| 9,609,991 B2 | 4/2017 | Hillman, Jr. et al. |
| 9,717,387 B1 | 8/2017 | Szatmary et al. |
| 9,764,472 B1 | 9/2017 | Ebrahimi Afrouzi et al. |

(Continued)

FOREIGN PATENT DOCUMENTS

| | | |
|---|---|---|
| CN | 104898660 A | 9/2015 |
| WO | 0038025 A1 | 6/2000 |

*Primary Examiner* — Bao Long T Nguyen
(74) *Attorney, Agent, or Firm* — Andrew R. Aranda

(57) ABSTRACT

A system dynamically generates a cleaning coverage pattern of an area using waypoints and sensor data from one or more sensor modalities. To do this, a robotic cleaning device moves through an area to be cleaned, identifies consecutive waypoints through the area, and stores the waypoints in a memory. At least one sensor of the robotic cleaning device collects sensor data about a portion of the area as the device moves between the consecutive waypoints. A temporary map of the portion of the area between the consecutive waypoints is generated based on the collected sensor data, and a cleaning coverage pattern is generated using the temporary map. The area is then cleaned by moving the robotic cleaning device according to the cleaning coverage pattern. In certain embodiments, upon completing the cleaning, the consecutive waypoints are retained in the memory, while the temporary map may not be retained.

14 Claims, 11 Drawing Sheets

(56) References Cited

U.S. PATENT DOCUMENTS

| | | | |
|---|---|---|---|
| 2003/0229421 A1* | 12/2003 | Chmura | A47L 9/2894 |
| | | | 700/258 |
| 2005/0085947 A1 | 4/2005 | Aldred et al. | |
| 2008/0294338 A1 | 11/2008 | Doh et al. | |
| 2014/0088761 A1 | 3/2014 | Shamlian et al. | |
| 2015/0157182 A1* | 6/2015 | Noh | G05D 1/0248 |
| | | | 701/28 |
| 2017/0329343 A1 | 11/2017 | Li | |
| 2017/0361468 A1 | 12/2017 | Cheuvront et al. | |
| 2018/0311820 A1 | 11/2018 | Fritz et al. | |
| 2018/0314254 A1 | 11/2018 | Bauer et al. | |
| 2019/0008350 A1 | 1/2019 | Chudkosky | |
| 2019/0120633 A1 | 4/2019 | Afrouzi et al. | |
| 2019/0354106 A1* | 11/2019 | Gupta | G05D 1/0212 |
| 2019/0360835 A1* | 11/2019 | Gariepy | G05D 1/0088 |
| 2022/0022716 A1 | 1/2022 | Wu et al. | |

\* cited by examiner

ROBOTIC CLEANING DEVICE WITH DYNAMIC AREA COVERAGE

BACKGROUND

Mobile robotic devices have reduced the human effort required to perform many everyday tasks. For example, automatic cleaning devices help maintain and clean surfaces, such as hardwood floors, carpet and the like. An example of such as device is disclosed in U.S. Pat. No. 9,028,617, titled "Cleaning Device with Single Tank Recycling System," the disclosure of which is fully incorporated into this document by reference.

Customers who use such devices to clean floors wish to have the machines perform their cleaning tasks in the shortest possible amount of time, while also avoiding collisions with, e.g., walls, storage/shelving units, machinery, in-store displays, and/or other obstacles. This often requires the mobile robotic device to be pre-loaded with a detailed map of the area(s) to be cleaned within a facility, which the device relies upon to identify and avoid known obstacles and follow a predetermined cleaning pattern. While the mobile robotic device is able to operate at higher speeds throughout such a known environment, reliance upon a detailed map of the area(s) to be cleaned requires that the obstacles remain substantially unchanged over time. However, in many facilities such as grocery stores, storage warehouses, etc., obstacles within the cleaning environment often change, sometimes on a daily basis. Thus, the detailed map of the area(s) to be cleaned must be constantly updated or replaced to account for such changes, making their use in many facilities time-consuming and/or impractical.

As an alternative to utilizing detailed maps, some mobile robotic devices are also capable of navigating through one or more areas to be cleaned without any advance knowledge of the area(s), relying primarily on the various on-board sensors to determine a cleaning path, avoid obstacles, etc. While this type of navigation allows for the device to operate in facilities with changing obstacles without the need for pre-loaded maps, there may be disadvantages to such "on-the-fly" operation. For example, because the device is not following any predetermined route, the device may explore openings and/or areas that the user does not desire to be cleaned. Additionally, because the device must rely solely on the on-board sensors for navigation and obstacle avoidance, the overall speed at which the device is able to operate is slower than that of a device utilizing at least some form of pre-loaded map.

This document describes methods and systems that are intended to provide a robotic cleaning devices capable of more efficiently moving through a facility and/or along a cleaning route having changing obstacles.

SUMMARY

In some embodiments, this document describes a method of dynamically generating a coverage pattern in an area to be cleaned by a robotic cleaning device, The method includes, using a processor, moving the robotic cleaning device through an area to be cleaned, identifying a plurality of consecutive waypoints through the area to be cleaned, and storing the consecutive waypoints in a memory. As the robotic cleaning device moves between the consecutive waypoints, one or more sensors that are integral with the robotic cleaning device will collect sensor data about a portion of the area. The processor will generate a temporary map of the portion of the area between the consecutive waypoints based on the collected sensor data, and it will use the temporary map of the portion of the area between the consecutive waypoints to generate a cleaning coverage pattern. The robotic cleaning device will then clean the area by moving throughout the portion of the area according to the cleaning coverage pattern. Upon completing the cleaning, the device will retain the consecutive waypoints in the memory while not retaining the temporary map.

Optionally, after completing the cleaning, the processor may receiving a new command to clean the area. If so, then the processor will retrieve the consecutive waypoints from the memory, and the sensor(s) will collect new sensor data about an updated portion of the area as the robotic cleaning device moves between the consecutive waypoints. The processor will generate a new temporary map based on the collected new sensor data, and it will use the new temporary map to generate a new cleaning coverage pattern. The robotic cleaning device will then move through the area according to the new cleaning coverage pattern and clean the area. Upon completing the cleaning according to the new cleaning coverage pattern, the device will continue to retain the plurality of consecutive waypoints in the memory while not retaining the new temporary map.

Optionally, identifying the consecutive waypoints may include identifying locations in the area in which a direction of travel of the robotic cleaning device has changed by at least an angular threshold when the robotic cleaning device is moved through the area. Alternatively, identifying the consecutive waypoints may include identifying locations in which a manually-activated selection is made by an operator when the robotic cleaning device is moved through the area. As yet another alternative, to identify the consecutive waypoints, the system may cause the mobile robotic device to move in a first direction until a first location at which a sensor of the mobile robotic device detects that the mobile robotic device cannot continue to move in the first direction without coming within a threshold distance from a first obstacle, and then causing the mobile robotic device to move in a second direction starting at the first location until a second location at which the sensor of the mobile robotic device that the mobile robotic device cannot continue to move in the second direction without coming within the threshold distance from a second obstacle. In any of these cases, the system will record each of the identified locations as one of the consecutive waypoints.

In other embodiments, a method of causing a robotic cleaning device to clean an area includes moving a robotic cleaning device through an area to be cleaned, identifying a first waypoint and a second waypoint in the area, storing the first waypoint and the second waypoint in a memory, and causing the robotic cleaning device to move from the first waypoint to the second waypoint. As the robotic cleaning device moves from the first waypoint to the second waypoint, at least one sensor that is integral with the robotic cleaning device will collect sensor data about a first portion of the area. The processor will use the collected sensor data to generate a temporary map of the first portion of the area. The processor will use the temporary map to generate a cleaning coverage pattern for the first portion of the area, cause the robotic cleaning device to move according to the cleaning coverage pattern and clean the area. Upon completing the cleaning of the first portion of the area, the processor will retain the first waypoint and the second waypoint in the memory while not retaining the temporary map.

Optionally, the process may also identify a third waypoint in the area to be cleaned, store the third waypoint in the memory, and determine whether a cleaning operation in the first portion of the area has been completed. When the cleaning operation of the first portion of the area has been completed, the processor may cause the robotic cleaning device to move from the second waypoint to the third waypoint. As the robotic cleaning device moves from the second waypoint and the third waypoint, the sensor(s) integral with the robotic cleaning device will collect additional sensor data about an additional portion of the area. The processor will use the collected additional sensor data to generate an additional temporary map of the additional portion of the area. The processor will use the additional temporary map of the additional portion of the area to generate an additional cleaning coverage pattern for the additional portion of the area. The processor will clean the additional portion of the area according to the additional cleaning coverage pattern. Upon completing the cleaning of the additional portion of the area, the system will retain the first waypoint, the second waypoint, and the third waypoint in the memory while not retaining the additional temporary map. Optionally, to identify the first waypoint, the second waypoint, and/or the third waypoint comprises, the processor may record a location in which a direction of travel of the robotic cleaning device has changed by more than an angular threshold when the robotic cleaning device is moved through the area.

In another embodiment, this disclosure describes a method of dynamically generating a coverage pattern for an area to be cleaned by a robotic cleaning device. The method include moving a robotic cleaning device through an area to be cleaned, identifying consecutive waypoints through the area to be cleaned, and storing the consecutive waypoints in a memory. At least one sensor that is integral with the robotic cleaning device will collect sensor data about a portion of the area as the robotic cleaning device moves between the consecutive waypoints. The processor will use the collected sensor data to generate a map of the portion of the area between the consecutive waypoints. The processor will store the map in the memory, use the map of the portion of the area between the consecutive waypoints to generate a cleaning coverage pattern; and save the cleaning coverage pattern to a memory. The system also may cleaning the area by moving the robotic cleaning device throughout the portion of the area according to the cleaning coverage pattern. The system may retain the consecutive waypoints in the memory upon completing the cleaning of the area, but not retain the map in the memory for a predetermined period after completing the cleaning of the area. After completing the cleaning, the system may receive a new command to clean the area, retrieve the consecutive waypoints from the memory, collect new sensor data about an updated portion of the area as the robotic cleaning device moves between the consecutive waypoints, updating the map for the updated portion of the area based on the collected new sensor data, store the updated map in the memory, and using the updated map to generate a new cleaning coverage pattern for the updated portion of the area. The system may then continue to clean the area by moving the robotic cleaning device throughout according to the new cleaning coverage pattern. The system also retain the consecutive waypoints in the memory upon completing the cleaning according to the new cleaning coverage pattern, while deleting the new map from the memory upon completing the cleaning according to the new cleaning coverage pattern. Alternatively, the system may retain the new map in the memory for a period after completing the cleaning of the area according to the new cleaning coverage pattern.

In another embodiment, a method of moving a robotic cleaning device through an area may include loading instructions for a plurality of geometric elements into a processor. Each geometric element will include a starting point, one or more paths of travel, and one or more waypoints. In addition, an ending waypoint of a first geometric element will be connected to the starting point for a subsequent geometric element. The instructions for each geometric element will not include dimensions for the one or more paths of travel. A processor of the robotic cleaning device will cause the robotic cleaning device to move along a first path of travel of the first geometric element until a sensor of the robotic cleaning device detects that the robotic cleaning device has reached a first waypoint. If the first waypoint is the ending waypoint of the first geometric element, the processor will cause the robotic cleaning device to move along a first path of travel of the subsequent geometric element. If the first waypoint is not the ending waypoint of the first geometric element, the processor will cause the robotic cleaning device to change direction and move along a second path of travel of the first geometric element.

Optionally, in this embodiment, as the robotic cleaning device moves along each path of travel, it may operate a cleaning assembly to clean an area that includes each path of travel.

Optionally, the sensor may detect the first waypoint by detecting that the robotic cleaning device has come within a threshold distance from a first obstacle, step or change in floor type that is ahead of it the first path of travel of the first geometric element. The sensor may detect the first waypoint by detecting a visual marker that is positioned along the path of travel. The sensor also may detect the first waypoint by receiving a communication via a beacon that is located at the first waypoint.

DETAILED DESCRIPTION

Figure 1:
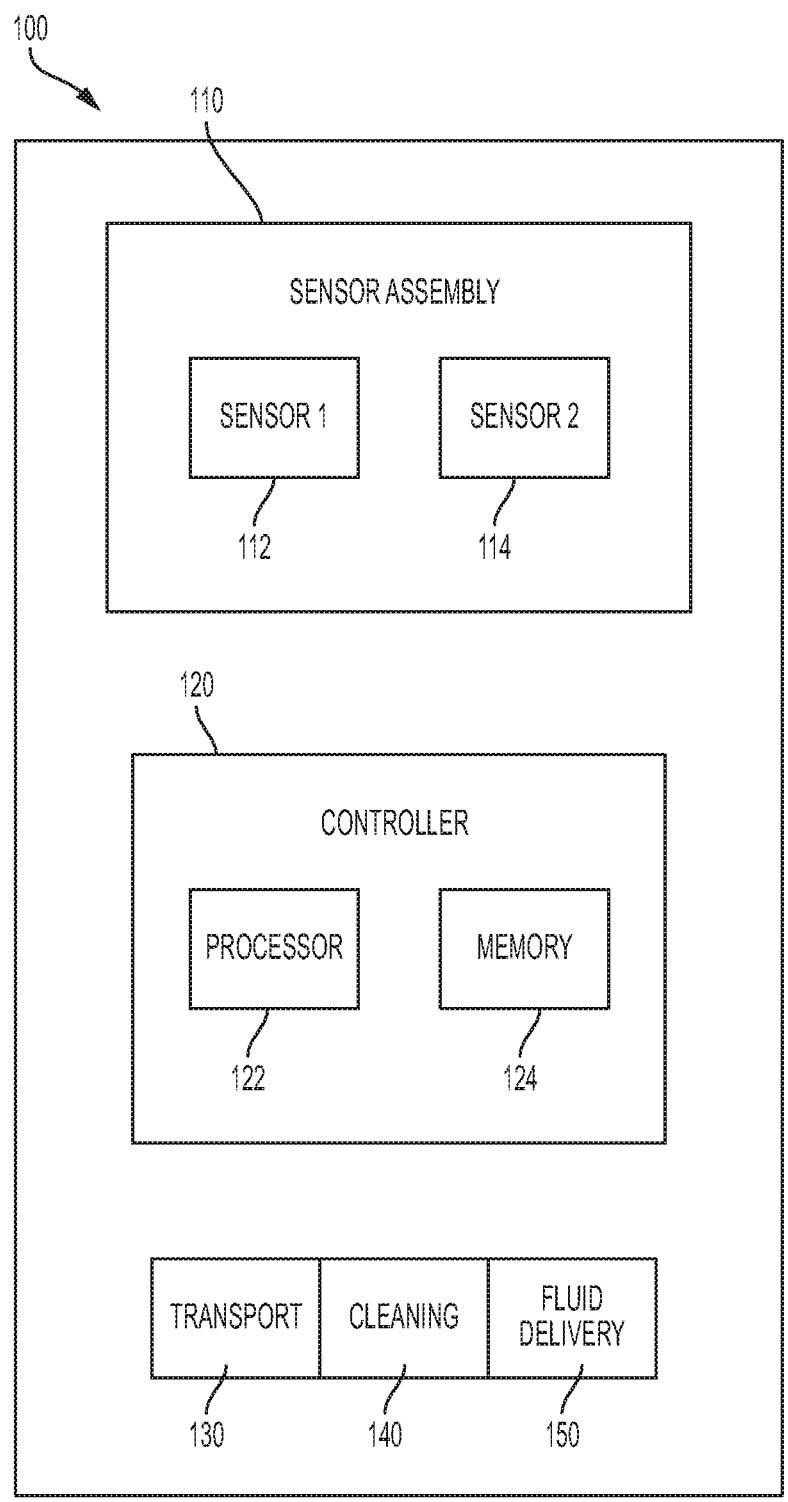
FIG. 1 is a block diagram showing a mobile robotic device in accordance with an aspect of the disclosure.

In this document, the singular forms "a," "an," and "the" include plural references unless the context clearly dictates otherwise. In this document, the term "comprising" means "including, but not limited to." Unless defined otherwise, all technical and scientific terms used in this document have the same meanings as commonly understood by one of ordinary skill in the art.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

A "robot" or "robotic device" is a system that is capable of autonomous movement and that performs both physical and computational activities. The physical activities may be performed using a wide variety of movable parts including various tools, such as scrub brushes, liquid applicators and vacuum systems in a robotic cleaning device. The computational activities may be performed using a suitable processor and computer readable memory devices that are part of the robot, that are external to the robot on a system that communicates with the robot by a communication signal delivered via communication technologies such as Wi-Fi, short range communication, or near field communication. The computational activities may include processing information input from various sensors or other inputs of the robotic device to perform commanded functions such as vacuuming, scrubbing, or applying water or cleaning solution to a floor. Furthermore, while robotic cleaning devices are described throughout the present disclosure, it is to be understood that the "robot" or "robotic device" is not necessarily limited to a robotic cleaning device, and may be any mobile robotic device capable of covering an area, including devices covering the area for purposes other than (or in addition to) cleaning operations.

FIG. 1 is a block diagram showing a mobile robotic device 100 in accordance with an aspect of the present disclosure. As shown in FIG. 1, the robotic device 100 may include a sensor assembly 110, a controller 120 operably connected to the sensor assembly 110, and a transport assembly 130 operably connected to the controller. When the robotic device 100 is a cleaning device, it may also include elements such as a cleaning assembly 140 and a fluid delivery system 150. However, it is to be understood that robotic device 100 may omit one or both of the cleaning assembly 140 and fluid delivery system 150, and/or may include other implements. It should be noted that the elements as shown in FIG. 1 are shown by way of example only. Additional information related to robotic devices is shown in U.S. Pat. No. 6,667,592, titled "Mapped Robot System," the content of which is fully incorporated into this document by reference.

The sensor assembly 110 may include various components such as a first sensor assembly 112 and a second sensor assembly 114, which assemblies may include a sonar assembly, a light detection and ranging system (LIDAR) assembly, and/or other various sensor mechanisms such as other laser-based sensors, global positioning system (GPS) devices, microwave sensors, cameras, gyroscopes, infrared (IR) sensors, structured light sensors such as structured light cameras and 3D structured light scanners, stereo cameras and other sensors that are capable of capturing information about the environment in which the robot is operating. Any combinations of these sensors may be used, and the sensors may be placed in various locations on the robotic device, such as its front, rear, or sides. The sensors will collect information about the mobile robotic device's surroundings such as coordinates, navigational information, visual information and/or the like. This document may refer to data collected by one or more of the sensors as "sensor data." For example, if the sensor assembly includes a sonar assembly, the system may include a tunable ultrasonic piezoelectric transducer configured to transmit sound at a desired pressure level, and to receive reflected sound so that the processor may use the reflected signals to calculate a distance between the robot and an obstacle such as a wall.

If the sensor assembly includes a camera, the device may process received images to locate one or more substantially straight, curved or otherwise shaped lines in the image that may be representative of a boundary that is formed by a wall, a step up or down, a transition between flooring types, or another obstacle or edge. For example, a video camera may be able to detect a corner where an aisle of a store or storage facility meets an intersecting aisle. Similarly, a video camera may be able to detect an edge based on a variation in floor type, such as by color contrast. The mobile robotic device may use this information, optionally with information from other sensors of the device to determine its position relative to the detected edge. For example, a mobile robotic device may compare information about its current position, such as its coordinates, heading and/or the like, with information received from the video camera regarding the edge. The mobile robotic device may use this comparison to determine its position relative to the edge, its distance away from the edge and/or the like.

The controller 120 may include a processor 122 and a computer-readable medium 124 such as a hard drive, an optical drive, a flash drive, a read-only memory or a random access memory containing programming instructions that are configured to cause the processor 122 to process information and control the other elements of the robot. In addition or alternatively to an on-board memory with programming instructions, the controller may be connected to a transceiver that is capable of receiving commands from one or more external systems.

The transport assembly 130 includes a mechanical system that is configured to move the robotic device from one place to another, such as a motor, drive system, and set of wheels, rollers, or the like. The speed of the robotic device may be determined via, for example, data received from optical encoders associated with the wheels, rollers, etc. However, other means of determining the speed of the robotic device are also within the scope of this disclosure.

The cleaning assembly 140 may include cleaning elements that are configured to contact, dislodge and/or draw particles from the floor to clean the floor. Examples of such cleaning elements include a cleaning head with and a scrubber, a squeegee, a vacuum system, and one or more motors to activate these elements.

The fluid delivery system 150 may include one or more tanks for holding fresh water and/or cleaning solution that is directed to the floor scrubber and/or other components of the cleaning assembly, and/or used water and/or cleaning solution that the cleaning assembly withdraws from the floor after application. The fluid delivery system 150 also will include elements for directing fluid to, and withdrawing fluid from, the floor such as filter, a discharge line, and a pump. For example, the fluid delivery system 150 may include a fluid dispensing tank, a pump for directing fluid from the dispensing tank to the floor cleaning devices via one or more conduits, a suction assembly such as a suction pump and conduit leading from the underside of the robotic device, and a fluid receiving tank.

The components of the robotic device 100 as described may be configured to perform a wide variety of operations. The robotic device may include a processor 122 that is configured to monitor and control various operations of the robotic device 100. The robotic device also may include a memory device 124 configured to store a variety of programming instructions and/or data used by the processor 122 as well as the other components of the robotic device 100.

The block diagram of FIG. 1 illustrates various operating components of the robotic device 100. It should be appreciated that the operating components of the robotic device 100, or select operating components of the robotic device 100, may be encased or enclosed in a suitable body or body portion. Alternatively, it should be appreciated that the operating components of the robotic device 100 may simply be suitably disposed on a support framework or structure.

Figure 2:
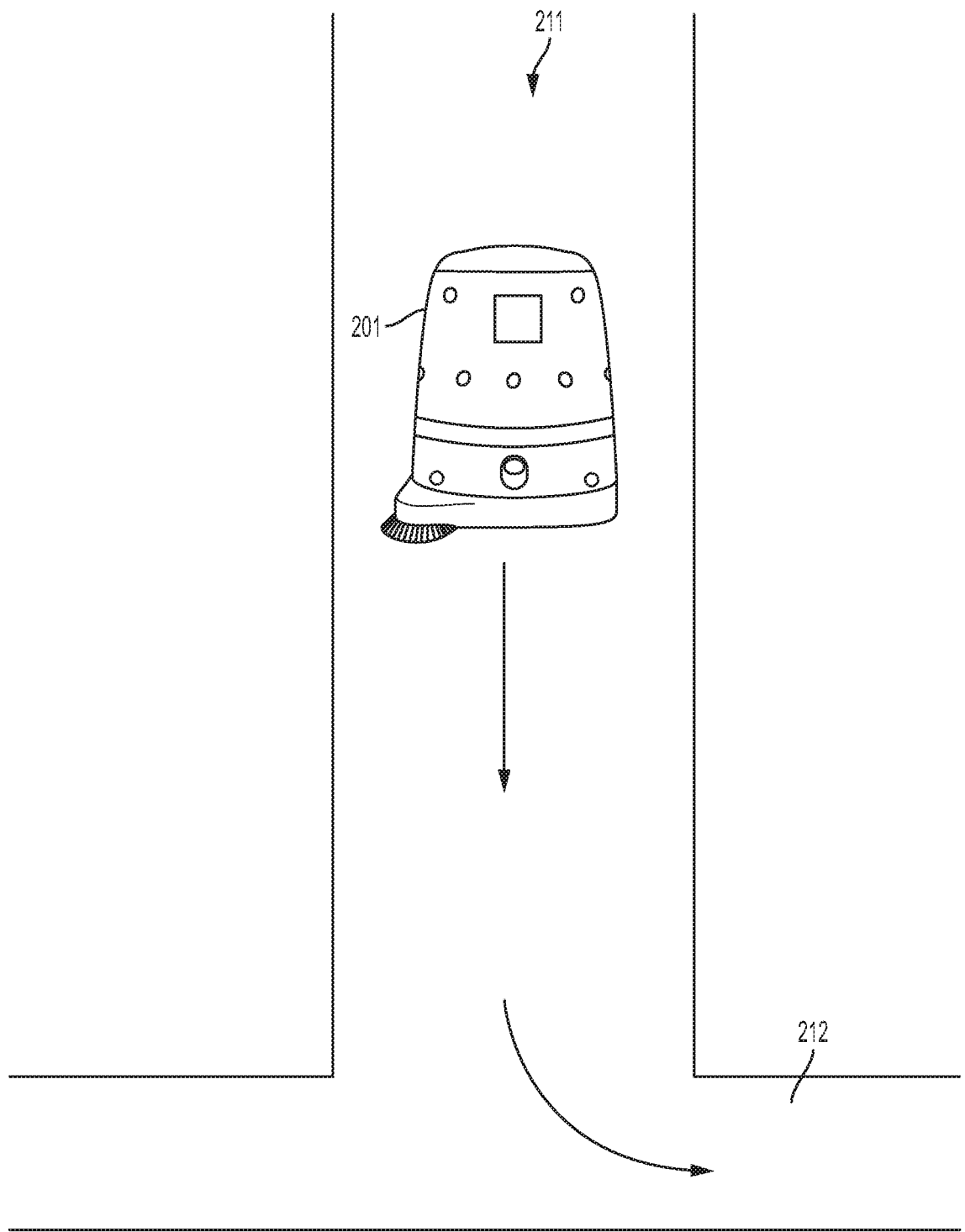
FIG. 2 illustrates an example method of navigating a mobile robotic device according to an aspect of the disclosure.

FIG. 2 illustrates an example method of navigating a mobile robotic device according to an aspect of the disclosure. As illustrated by FIG. 2, a mobile robotic device 201 may move through a first area 211 that is bounded by sidewalls. The first area may be a hallway, a room, an aisle, or other layout, and the sidewalls may be permanent walls or other structures such as shelving or storage units, cubicles, or even open areas that are designated as an aisle or similar area for movement, optionally such as by markings on the floor. The first area 211 may intersect with a second area 212, and the device's cleaning protocol may require the device 201 to turn and clean the second area 212 in either direction upon reaching the intersection.

To detect the intersection, the system may rely on information received from its various sensors. For example, if the robotic device includes a video camera positioned on its top or front (i.e., in a forward-facing direction, with "front" in this embodiment being a position facing the robotic device's direction of movement), the system may receive images and, by processing the images, detect a line representing a wall in front of it. The information may include values associated with the slope, the intercept and/or the error of a line detected by the video camera. For example, the slope, intercept and/or error associated with a substantially straight line from an image of a surface, such as a ground surface, a floor surface or other surface over which the mobile robotic device is traveling may be provided to the mobile robotic device. In some embodiments, the video camera may continuously capture images, and the processor may continuously process the images to update information as the robotic device moves in its area. For example, the processor may continue to process received images to update slope values, intercept values and/or error values associated with a detected line several times per second.

In accordance with an aspect of the disclosure, a mobile robotic device may use the various sensor information to determine its position relative to the detected edge. For example, a mobile robotic device may compare information about its current position, such as its coordinates, heading and/or the like, with information received from the video camera regarding the edge. The mobile robotic device may use this comparison to determine its position relative to the edge, its distance away from the edge and/or the like. Other sensor data, such as sonar or LIDAR data, may also be used to detect one or more edges the area.

Referring still to FIG. 2, in some conventional configurations, the mobile robotic device 201 may be pre-loaded or otherwise provided with a detailed map of the areas to be cleaned, thereby enabling the mobile robotic device to clean the first area 211 and turn in a desired direction to clean the second area 212. However, producing such a detailed map of the facility may be both time consuming and computationally intensive, and would generally require technician visits to the facility to program the desired areas to be cleaned. Furthermore, while the detailed map may take into account obstacles along the desired cleaning path during the technician's original visit, later changes and/or additions to the obstacles along the desired path may cause the mobile robotic device to divert from its pre-programmed cleaning scheme. In many facilities such as, e.g., grocery stores, storage warehouses, etc., changes and/or additions to the obstacles throughout various areas to be cleaned may be frequent. Thus, the detailed map would need to be updated just as frequently in view of these changes and/or additions, which may be unrealistic in certain facilities.

Alternatively, in other configurations, the use of a pre-loaded detailed map and pre-selected route is replaced with an "on-the-fly" approach in which the mobile robotic device utilizes the data acquisition and navigation abilities from its on-board sensors to travel throughout and clean the facility. While this automated approach may account for changes and/or additions to obstacles throughout a given area from day-to-day, travel of the mobile robotic device is not limited to a pre-selected path. Thus, the mobile robotic device may unnecessarily move through areas of the facility that do not require cleaning and/or the mobile robotic device may travel through undesirable openings in the facility layout (e.g., automated entrance/exit doors, etc.).

Thus, in accordance with an aspect of the disclosure, a system and method of generating an initial predetermined guide for a mobile robotic device to travel through desired areas of a facility is provided, with the system and method also accounting for changes and/or additions in obstacles throughout those desired areas to be cleaned. As will be described below with respect to FIGS. 3-6, the system and method may include the generation of one or more waypoints throughout desired areas of a facility to be cleaned, with those waypoints being saved by the mobile robotic device such that the device knows the general path/direction to follow while cleaning the facility, but does not require a pre-programmed, detailed area map to do so.

Figure 3:
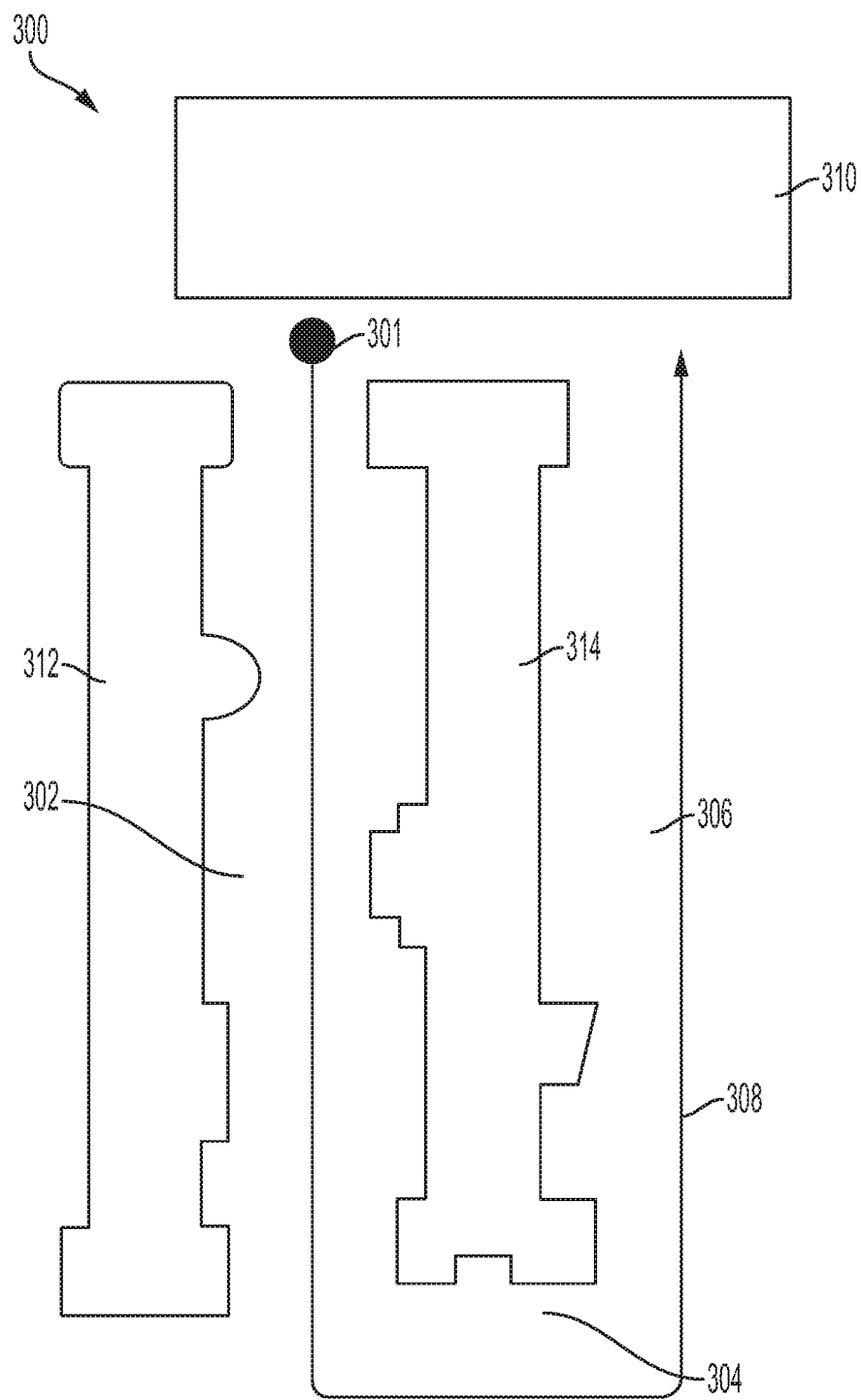
FIG. 3 illustrates a facility layout and a desired path of a mobile robotic device through the facility in accordance with an aspect of the disclosure.

Specifically, regarding FIG. 3, an example facility layout 300 in accordance with one embodiment of the disclosure is shown. Facility layout 300 may represent the general layout of any appropriate facility to be cleaned, e.g., a grocery store, a storage warehouse, etc. Facility layout 300 may include any number of obstacles 310, 312, 314, wherein each of the obstacles may represent one or more of a wall, storage shelving, machinery, store displays, etc. The overall shape of obstacles 310, 312, 314 is not necessarily constant and/or symmetrical. For example, as shown in FIG. 3, obstacles 312, 314 include various outcrops having various shapes and/or sizes. In some instances, these outcrops may represent temporary portions of the overall obstacles 312, 314 such as, e.g., temporary store displays, movable machinery, etc. It is to be understood that facility layout 300 may represent only a portion of an overall facility layout, and that more or fewer obstacles may be present.

Generally, facility operators know which areas of a facility necessitate coverage by a mobile robotic cleaning device, and which areas are to be avoided and/or omitted from coverage. In facility layout 300 shown in FIG. 3, the facility operators may wish for areas 302, 304, 306 to be cleaned, while other areas/openings are to be avoided. As discussed above, to clean these predetermined areas under prior art configurations, a detailed map of the areas to be cleaned would have been preloaded or otherwise communicated to the mobile robotic device. However, in accordance with aspects of the disclosure described with respect to FIGS. 3-6, such a predetermined detailed map is not required. Instead, as shown in FIG. 3, a mobile robotic device 301 is first driven through areas 302, 304, 306 along a simplified path 308, with the mobile robotic device 301 not completing any cleaning operation during this first pass along path 308. The mobile robotic device 301 may be driven manually by the operator (i.e., a technician or other user) during this first pass along path 308, but need not be driven manually thereafter.

Figure 4:
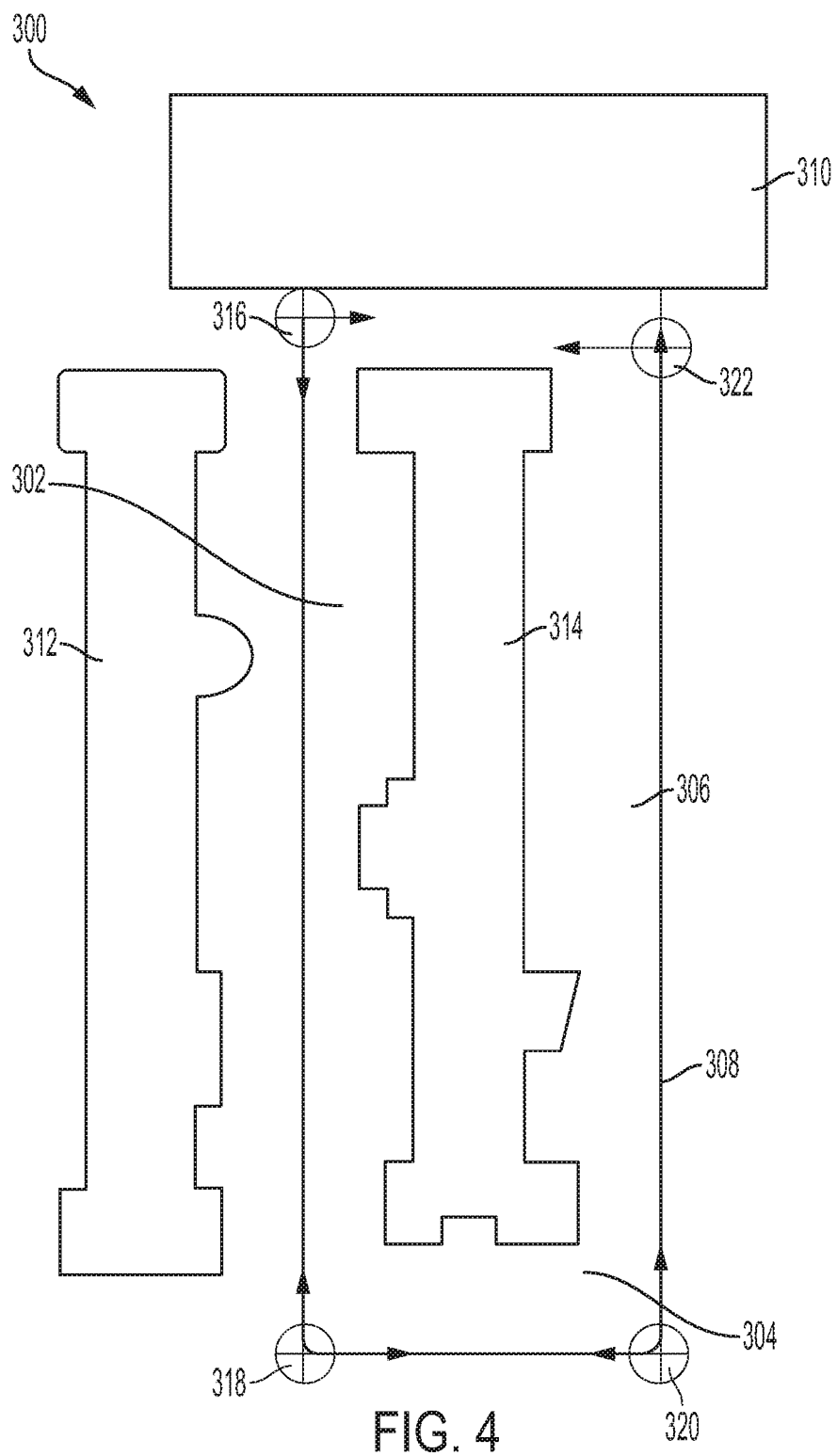
FIG. 4 illustrates a plurality of waypoints along the desired path of the mobile robotic device in accordance with an aspect of disclosure.

Next, referring to FIG. 4, as the mobile robotic device 301 is initially driven along the path 308 by the operator, a plurality of waypoints 316, 318, 320, 322 are captured and stored, with the storage of waypoints being either in the on-board memory of the mobile robotic device (i.e., memory 124) or in a remote memory capable of being accessed by the mobile robotic device. The waypoints 316, 318, 320, 322 may be manually selected (or "triggered") by the operator as the mobile robotic device 301 is driven along the path 308, and/or they may be automatically generated based on one or more characteristics of the path 308. For example, waypoint 316 may be generated, either manually or automatically, due to it being the initial starting point of mobile robotic device 301, as shown in FIG. 3. However, waypoints 316, 318 may be generated and stored based on a notable divergence and/or predetermined angular threshold in the direction of path 308. For example, as shown in FIG. 4, waypoints 316, 318 each represent locations in the area in which a direction of travel of the mobile robotic device has changed by at least a predetermined angular threshold—in this example 90° turns in path 308. Thus, during the initial manually-driven pass over path 308, waypoints 316, 318 may be automatically generated and recorded (stored) based on these notable directional changes. It is to be understood that the system and method is not necessarily limited to the automatic generation of waypoints at only 90° turns. For example, the system may be configured to automatically generate waypoints at any directional change along the path over a predetermined angular threshold (e.g., greater than or equal to 20°, greater than or equal to 45°, etc.). Finally, a waypoint 322 may be generated, either automatically or manually, marking the end point of the path 308. While four waypoints 316, 318, 320, 322 are shown and described with respect to FIG. 4, it is to be understood that more or fewer waypoints may be generated and stored dependent upon the facility layout, desired areas to be cleaned, etc. Accordingly, based upon the operator driving the mobile robotic device 301 through along the path 308, the waypoints 316, 318, 320, 322 are stored for future use, but no other information regarding the areas 302, 304, 306 are necessarily stored.

Figure 5:
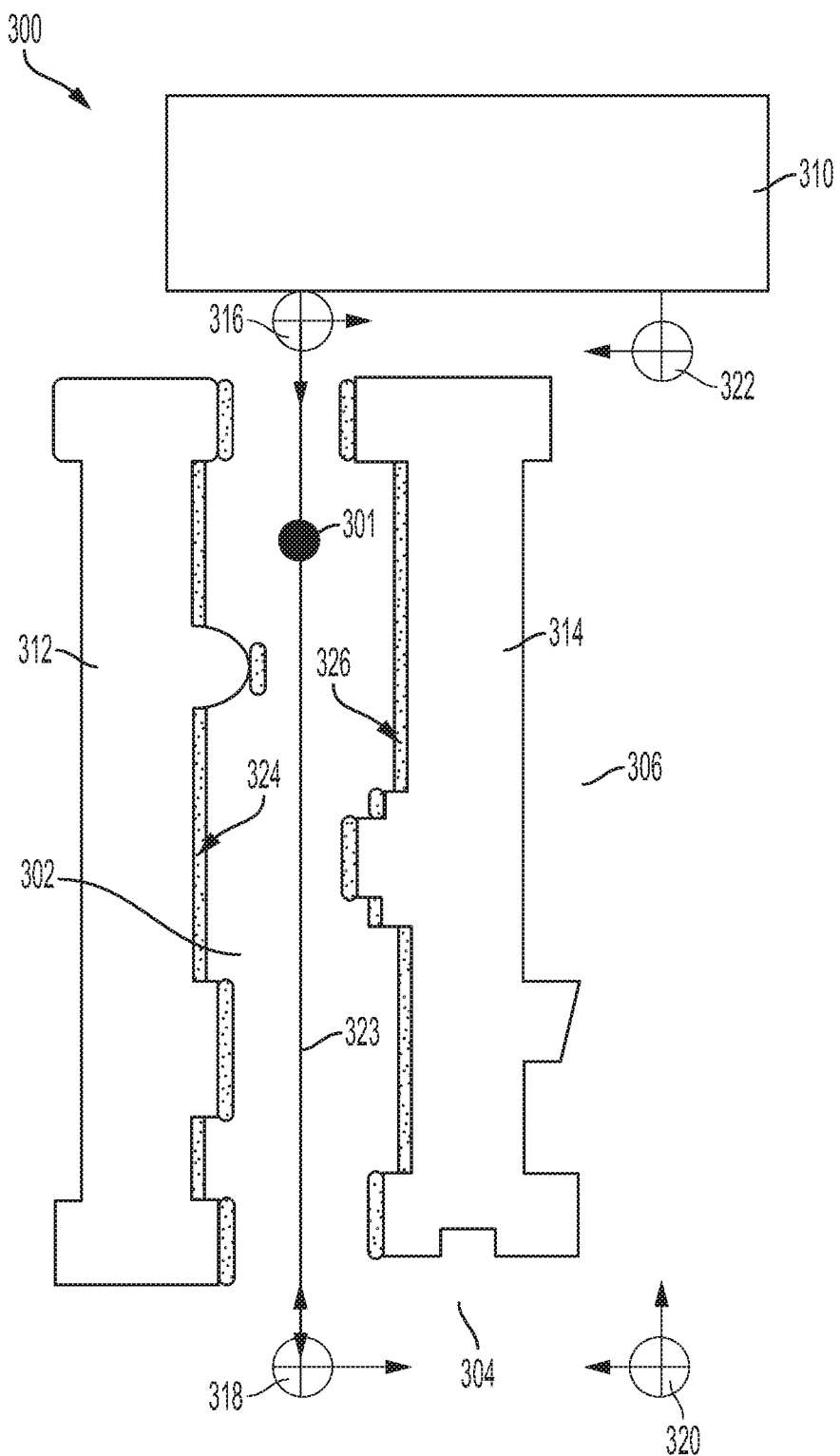
FIG. 5 illustrates a cleaning area and facility configuration between consecutive waypoints along the desired path of the mobile robotic device in accordance with an aspect of the disclosure.

Next, referring to FIG. 5, an initial automated cleaning pass of the mobile robotic device 301 in accordance with an aspect of the disclosure is illustrated. Utilizing the waypoints 316, 318, 320, 322 generated as described above with respect to FIG. 4, the mobile robotic device 301 may, at any desired time, be configured to travel between the respective waypoints 316, 318, 320, 322 to perform a cleaning operation in the respective areas 302, 304, 306. For example, as shown in FIG. 5, mobile robotic device 301 may begin the cleaning operation at first waypoint 316 and initially travel along a first path 323 between first waypoint 316 and second waypoint 318. As mobile robotic device 301 is traveling along first path 323, it not only performs an initial cleaning pass within area 302, but also utilizes one or more of its various on-board sensors to capture information regarding area 302 and create a temporary map of the entire area 302 between first waypoint 316 and second waypoint 318, including various non-permanent extensions outspreading from (or adjacent to) the obstacles 312, 314. Thus, with the temporary map of area 302 stored either on-board or remotely, the mobile robotic device 301 is capable of making multiple passes through area 302, including regions 324, 326 that are directly adjacent the obstacles 312, 314, respectively. As mobile robotic device 301 has a temporary map of area 302 prior to reaching these regions 324, 326, the mobile robotic device 301 is capable of more easily accounting for any non-linear and/or non-permanent obstacles within area 302, while still enabling the mobile robotic device 301 to operate at a relatively high rate of speed given the fact that any obstacles within area 302 are identified on the temporary map.

Upon completion of a cleaning operation of area 302 between waypoints 316, 318, it is to be understood that a similar cleaning operation may be completed in area 304 between waypoints 318, 320, and then in area 306 between waypoints 320, 322. As described above, the mobile robotic device 301 may generate a temporary map of areas 304, 306 so as to identify any obstacles to avoid within areas 304, 306 without unnecessarily slowing the mobile robotic device 301. After area 306 is fully cleaned, the mobile robotic device 301 may, e.g., end its travel at waypoint 322, return to first waypoint 316, alert an operator that the cleaning operation is complete, etc.

Figure 6:
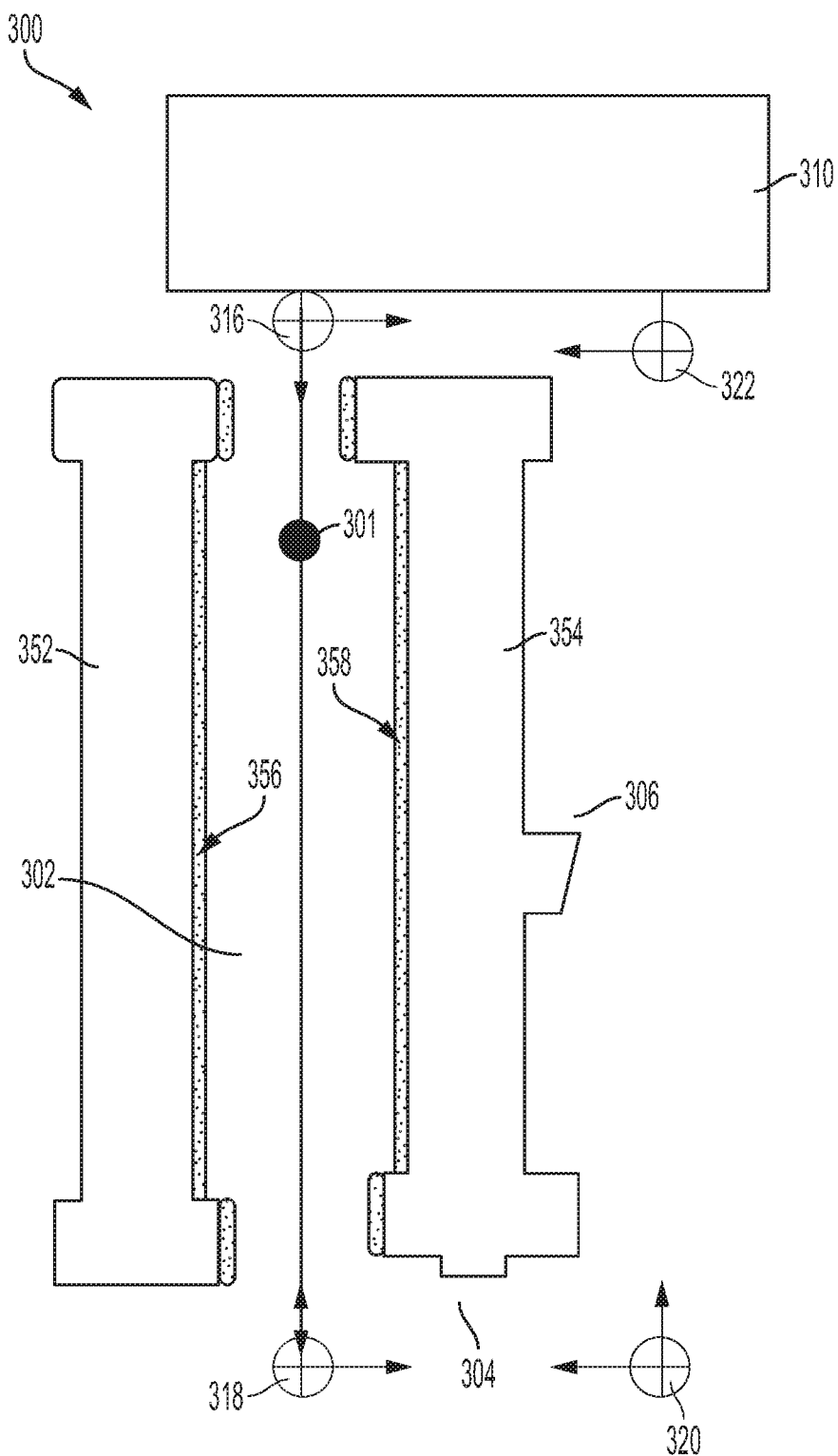
FIG. 6 illustrates a cleaning area and facility configuration between consecutive waypoints along a desired path of the mobile robotic device in accordance with another aspect of the disclosure.

Referring now to FIG. 6, as described above, the facility layout 300 is not necessarily static, as the obstacles present within or adjacent to the various areas to be cleaned may change over time. For example, FIG. 6 illustrates facility layout 300 with waypoints 316, 318, 320, 322, but at least two of the obstacles within have changed as compared to those shown in FIGS. 3-5. Specifically, area 302 is now partially bounded by two newly-configured obstacles 352, 354. Thus, the temporary map of area 302 generated above with respect to FIG. 5, which took into account obstacles 312, 314, would not accurately reflect the various obstacles present with and adjacent to these newly-configured obstacles 352, 354. Accordingly, when mobile robotic device 301 begins a new cleaning operation and makes an initial pass along first path 323 between waypoints 316, 318, mobile robotic device 301 generates and stores a new temporary map of area 302, including various non-permanent extensions outspreading from (or adjacent to) the obstacles 352, 354. Thus, with the new temporary map of area 302 stored either on-board or remotely, the mobile robotic device 301 is capable of making multiple passes through area 302, including regions 356, 358 that are directly adjacent the obstacles 352, 354, respectively. In this way, the mobile robotic device 301 is able to account for obstacle changes within facility layout 300, while still adhering to the same general path due to the storing of known waypoints 316, 318, 320, 322.

In some embodiments, the temporary maps generated during passes between consecutive waypoints are deleted from the memory of the mobile robotic device (and/or the remote accessible memory) at the end of each cleaning operation of the facility. Thus, while the location of the waypoints are retained, the mobile robotic device must generate a new temporary map with each cleaning operation, thereby ensuring that changes and/or additions to obstacles within the areas to be cleaned are identified and accounted for during each operation. In other, alternative embodiments, the temporary maps may be retained in the memory for a predetermined period of time (e.g., one day, one week, one month, etc.), which may be advantageous in facilities without frequent obstacle variations. In still other alternative embodiments, the temporary maps may be retained in the memory until an operator or technician indicates that new temporary maps must be generated. In these alternative embodiments, re-acquiring temporary maps during each cleaning operation (which may slow the cleaning process) may be avoided, while still obviating the need for detailed, technician-programmed maps of the areas to be cleaned.

Figure 7:
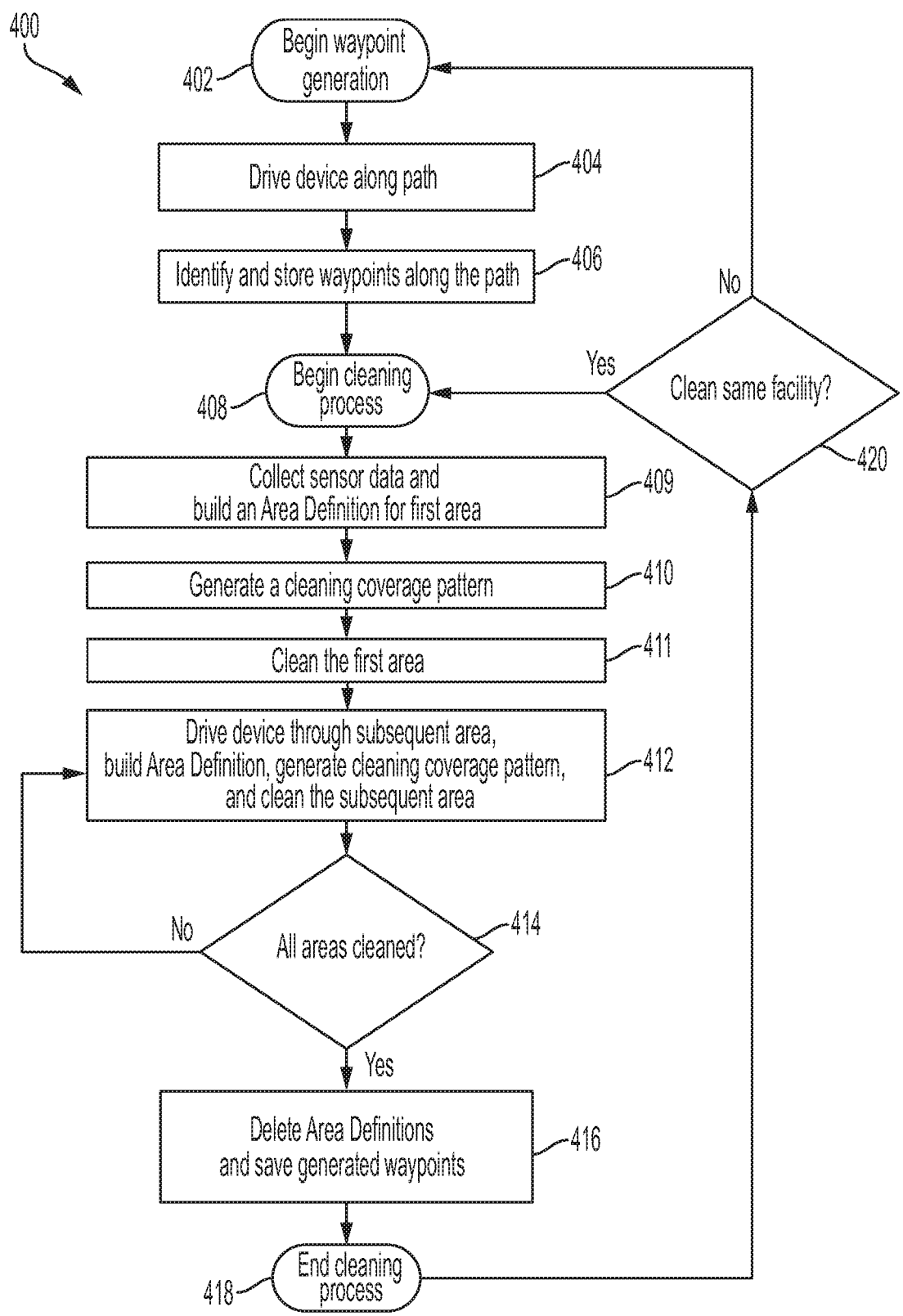
FIG. 7 illustrates a flowchart of a method of cleaning select areas within a facility by a mobile robotic device in accordance with an aspect of the disclosure.

Next, regarding FIG. 7, a method 400 of cleaning specific areas of a facility with a mobile robotic device in accordance with an aspect of the disclosure is illustrated. First, at step 402, a waypoint generation process is commenced. Specifically, at step 404, the mobile robotic device is manually driven by a technician or other operator along a path, or automatically operated on a defined path through general areas of the facility that are to be cleaned. Waypoints are then identify (either manually entered or automatically identified) along the path and stored in on-board and/or remotely-accessible memory at step 406. If the waypoints are manually entered by an operator, the operator also may enter an instruction as to what direction the device is to travel when it moves beyond the waypoint. If the waypoints are automatically identified, the device may be programmed with instructions as to the path of travel beyond each waypoint. (Methods of automatically identifying waypoints are described below in the discussion of FIGS. 8-9.)

Then, at step 408, a cleaning process is begun. During this process, at step 409, the mobile robotic device automatically drives through a first area to be cleaned between a first waypoint and a second waypoint, collecting data from its sensors and using that data to build an Area Definition (i.e., digital data representing a temporary map) of the first area. The sensor data may include digital video data from a camera, LiDAR data, sonar data, and other sensor data. For example, the sensors may automatically and periodically collect data indicating distance of obstacles (such as walls) or changes in floor surface (such as tile-to-carpet, or one-level-to-step up or down) and return it to the device's processor at periodic intervals. The processor will save this data into a memory as an obstacle map grid or other suitable map structure. The obstacle map grid represents the two-dimensional space around the machine, front, left, right, and behind. For example, the grid is comprised of a set of 128 mm×128 mm cells around the machine. Each cell may be given a weight or score, such as a weight of zero representing no detected obstacle in the location corresponding to the cell. If a sensor reports an obstacle, the corresponding cell's weight may be increased. When there is a non-zero weight in a cell, this indicates to the machine that there is an obstacle near the machine at the location corresponding to the cell. Additional aspects of this example map generation process are disclosed in U.S. Pat. No. 8,958,937, titled "Mapped robot cleaning system," the disclosure of which is fully incorporated into this document by reference. Additional methods of generating maps that may be used in step 409 are disclosed in, for example, U.S. Pat. No. 9,609,991 titled "Methods and systems for movement of an automatic cleaning device using video signal," the disclosure of which is fully incorporated into this document by reference.

Once the system generates the temporary map for the first area (between the first and second waypoints), at step 410 the system will then generate a cleaning coverage pattern for the first area and, at step 411, use the cleaning coverage pattern to clean the first area between the first and second waypoints. The cleaning coverage pattern may include instructions to move the device through substantially the entire area without hitting obstacles known in the temporary map. The cleaning coverage pattern also may include several passes through areas using different cleaning modes such as vacuum and/or scrub. The modes may vary based on the type of flooring that the temporary map indicates us under the device at any given time. Methods of generating cleaning coverage patterns are further described in the patents incorporated above by reference.

At step 412, the mobile robotic device drives through the subsequent area to be cleaned between the previous ending waypoint (in this case, the second waypoint) and the next ending waypoint, again building an Area Definition of the subsequent area, generating a cleaning coverage pattern for the subsequent area and cleaning the subsequent area.

Next, at step 414, a determination is made whether or not all areas located between generated waypoints have been cleaned. If no, step 412 is repeated until an Area Definition is built for each area between consecutive waypoints and those areas are cleaned. However, if yes, at step 416, all previously-built Area Definitions (i.e., temporary maps) are deleted from the system memory, while all waypoints are retained within the system memory. The cleaning process is then ended at step 418. Later, a determination is made whether or not the mobile robotic device is to clean the same facility again (step 420). If yes, the process repeats from step 408, as the previously-generated waypoints within the facility are still applicable. However, if no, and a new facility is to be cleaned, the process repeats from step 402, as new waypoints will need to be generated for the new facility.

If the process is repeating for the same facility from step 408, the system will retrieve the previously identified waypoints (from step 406) for the facility and will then collect updated sensor data about updated portions of each area between waypoints, and generate new temporary maps for each area, at steps 409-411 on the updated passes through each area.

By utilizing the method 400 as described above, a mobile robotic device is capable of cleaning desired areas of a facility by relying primarily upon generated waypoints and current Area Definitions as opposed to more detailed, pre-programmed maps of the facility. In this way, minor changes to the layout of the facility and/or obstacles present within the areas to be cleaned may be accounted for without the need for new detailed maps to be generated, thereby obviating the need for repeated technician visits to re-program the mobile robotic device in light of such facility changes.

Figure 8:
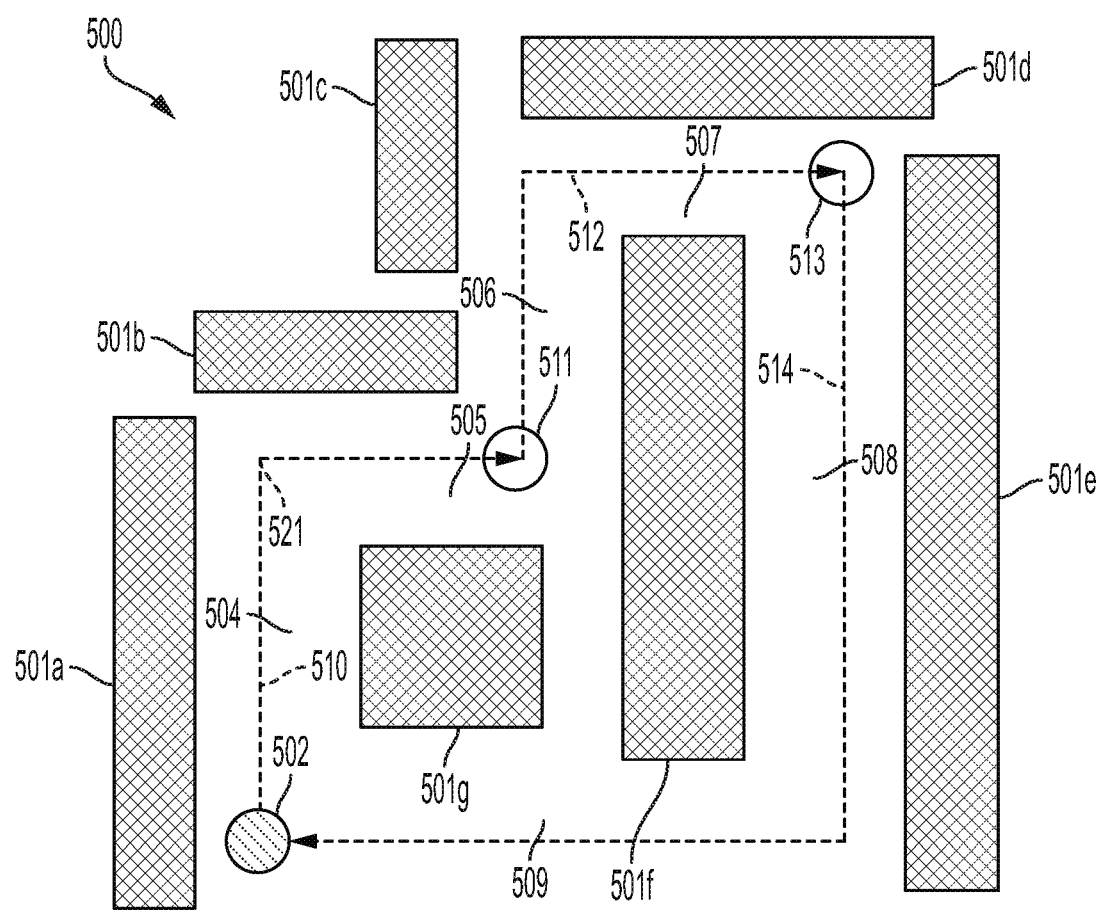
FIG. 8 illustrates a facility layout and a desired path of a mobile robotic device through the facility in accordance with another aspect of the disclosure.

Referring now to FIG. 8, a facility layout 500 (and method of cleaning the same) in accordance with another aspect of the disclosure is illustrated. Unlike the embodiments described above with respect to FIGS. 3-7, which utilized pre-generated waypoints to generally instruct a mobile robotic device of which areas within a facility to clean, the embodiment shown in FIG. 8 utilizes a plurality of "snapped together", or combined, predetermined arrangements in order to inform the mobile robotic device of which areas to clean (and in which order) as it moves through the facility.

As shown in FIG. 8, facility layout 500 includes a plurality of obstacles 501a-501g. Again, these obstacles 501a-501g may represent, e.g., walls, storage/shelving units, machinery, in-store displays, and/or any other obstacles, and it is to be understood that they may be positioned differently than what is shown in FIG. 8, and there may be more or fewer obstacles than what are shown. A mobile robotic device 502 is provided to automatically clean the facility. Prior to any cleaning operation by the mobile robotic device 502, an operator and/or technician may determine the specific areas to be cleaned/avoided, as well as the order in which those areas are cleaned. For example, as shown in FIG. 8, the operator and/or technician may determine that areas 504, 505, 506, 507, 508, 509 are to be cleaned, and all other areas and/or openings are to be avoided.

However, unlike the embodiments described above in which pre-generated waypoints are utilized in generally determine the path of the mobile robotic device through the facility, the embodiment shown in FIG. 8 utilizes a series of "snapped together" geometric elements, which may be pre-programmed or otherwise provided to the mobile robotic device 502, without the need for the mobile robotic device 502 to be manually directed along a desired path during an initial set-up procedure. In this disclosure a "geometric element" is a defined geometric shape, such as a rectangle, an "L" shape, or a first rectangle with second rectangle attached to the first rectangle at an angle that is less than 90° (such as 30° or 45°). The programming instructions for each geometric element will include a starting point, a direction of travel from the starting point, and one or more waypoints. As is shown in FIG. 8, a plurality of geometric elements 510, 512, 514 may be organized in series, end-to-end, with each starting point connected to the ending waypoint of the previous geometric element, to build a preferred cleaning route through the desired areas 504, 505, 506, 507, 508, 509. Each of these geometric elements 510, 512, 514 is characterized by simple instructions which may be implemented by the mobile robotic device 502 during a cleaning operation. For example, predetermined arrangement 510 is shown as a first inverted 'L'-shape with a starting point at the location of the mobile robotic device 502 and an ending waypoint at the first arrowhead 511 along the dotted line. The mobile robotic device 502, when oriented correctly at its origin, may be instructed to navigate through (and clean) area 504, then turn right at waypoint 521 to navigate through (and clean) area 505. Such simplified navigation instructions are easily expressed to the software of the mobile robotic device 502, and the mobile robotic device 502 is capable of using its various on-board sensors to navigate and clean within the areas 504, 505 without the need for a detailed map of those areas.

When the mobile robotic device 502 reaches the end of the predetermined arrangement 510 (identified as waypoint 511 in FIG. 8), the mobile robotic device 502 may be instructed to follow a second inverted 'L'-shape from waypoint 511 to waypoint 513, which forms second geometric element 512. In this way, the mobile robotic device 502 cleans areas 506 and 507 by way of simplified, single-turn instructions expressed to the software of the mobile robotic device 502. Similarly, when the mobile robotic device 502 reaches an end of the geometric element 512 (identified as waypoint 513 in FIG. 8), the mobile robotic device 502 may be instructed to follow a reverse 'L'-shape path so as to clean areas 508, 509, eventually cleaning all desired areas of the facility.

Each geometric element that is not a straight line may include one or more waypoints at which the mobile robotic device must change its direction of travel. For example, geometric element 510 includes a waypoint 521 at which the mobile robotic device must make a 90° turn to the right. The ends of each geometric element also may be considered waypoints (as in previous embodiments) at which the mobile robotic device will start cleaning another geometric element (i.e. another location of the area to be cleaned). For example, the endpoint 511 of geometric element 510 is a waypoint at which the mobile robotic device must make a 90° turn to the left.

In the embodiment shown in FIG. 8, the data representing each geometric element will include only instructions for the device's direction of travel at each waypoint, and will not include measurements of distance. Instead, the device will use its sensors to detect the waypoints and will make a turn at each waypoint according to the programming instructions for the geometric element that includes the waypoint. To detect the waypoints, the system may use video, sonar, LiDAR and/or other sensors to detect obstacles or markers which indicate that a waypoint will exist. For example, the system may use video, sonar or LiDAR to detect that an obstacle, a change in floor type (e.g., a carpet/tile interface), or a step up or down is located in front of the device in the device's direction of travel. The waypoint may be a defined distance from the obstacle, change in floor type or step. The waypoint also may be a marker that is placed in the area, such a marker that can be seen by a camera and detected by image processing, or a beacon placed in the flooring, in the ceiling, or on a wall so that the beacon can be detected by an antenna. The beacon and antenna may communicate using any suitable communication protocol, such as near-field or short range communications using radio frequency identification (RFID), Bluetooth or other communication protocols. In such a situation, the waypoint may be a position that is on, under, or within a defined distance from the marker.

By joining these simplified, single-turn predetermined arrangements in an end-to-end fashion, a mobile robotic device may be instructed to follow more complex routes through a facility without frequent operator intervention and/or detailed maps. Furthermore, while FIG. 8 illustrates three end-to-end geometric elements 510, 512, 514, it is to be understood that more or fewer geometric elements may be utilized. Additionally, while FIG. 8 illustrates to that mobile robotic device 502 follows a path which returns the device back to its point of origin, it is to be understood that this configuration is not necessary, as the mobile robotic device 502 may begin and end the cleaning process in separate locations within the facility.

While the geometric elements 510, 512, 514 are illustrated as single, 90° turn arrangements, it is to be understood that the method described herein is not limited as such, and that each geometric element may have no turns, a single turn of less than or more than 90°, and/or more than one turn. Given a suitable graphical method of selection, an operator and/or technician may combine geometric elements in any number of ways so as to pre-select a desired path through areas to be cleaned within a facility. Furthermore, in some embodiments, the specific combination of geometric elements may be deleted from the memory of the mobile robotic device 502 after completion of each cleaning operation. However, in other embodiments, the combination(s) of geometric elements may be stored for later use within the same (or a similar) facility.

Although it is not shown in FIG. 8, it is to be understood that the operator and/or technician may utilize any appropriate interface in order to choose the desired geometric elements, along with the order in which the geometric elements are combined to form a desired path through the facility. For example, a graphical user interface (GUI) provided on the mobile robotic device 502 or another communicatively connected electronic device may provide the operator with clear visual representation of a plurality of geometric elements from which to choose. Additionally and/or alternatively, the predetermined arrangements may be programmed into the mobile robotic device 502 in any other easily human-readable form.

Additionally, while the method described above with respect to FIG. 8 implies that areas 504, 505, 506, 507, 508, 509 are cleaned in their entirety, it is to be understood that one or more of the geometric elements may be further defined so as to provide limitations to the cleaning operation within the areas. For example, one or more of the geometric elements may include defined "offsets", which instruct the mobile robotic device 502 to clean only certain portions of an area, while avoiding others (e.g., an offset in an area having a wide baseboard protruding from a wall that may not be visible to the device's sensors, but is to be avoided).

Furthermore, in other embodiments, one or more of the geometric elements (or a portion of the geometric element(s)) may be defined so as to direct the mobile robotic device 502 to move through an area (or areas) without cleaning. These "move" areas may be portions of the facility that are not to be cleaned, but connect two or more other areas of the facility that are to be cleaned.

Figure 9:
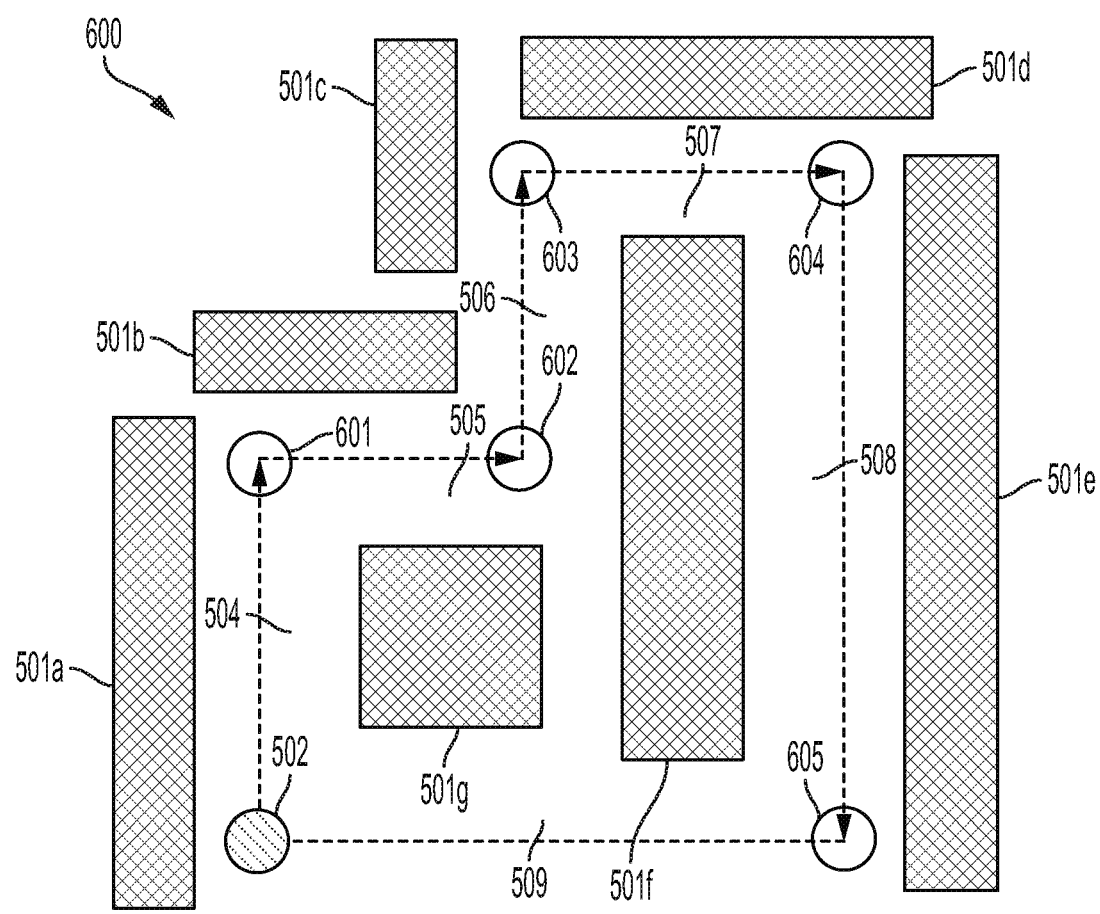
FIG. 9 illustrates a facility layout and a desired path of a mobile robotic device through the facility in accordance with another aspect of the disclosure.

Next, referring to FIG. 9, a facility layout 600 (and method of cleaning the same) in accordance with another aspect of the disclosure is illustrated. For ease of understanding, facility layout 600 includes the same plurality of obstacles 501*a*-501*g* and areas 504, 505, 506, 507, 508, 509 as described above with respect to FIG. 8. However, unlike the method described above with respect to FIG. 8, which utilized combined geometric elements to execute a cleaning operation, the method associated with FIG. 9 utilizes even simpler graphical constructs to allow an operator and/or technician to direct the mobile robotic device 502 to follow a desired path and/or cleaning operation.

For example, the facility layout 600 shown in FIG. 9 may be provided to the user on a graphical user interface located on the mobile robotic device 502 and/or on a remote device coupled to the mobile robotic device 502. From the graphical user interface, the operator and/or technician may select and/or draw lines, circles, etc. which may signify a desired path through areas to be cleaned, as well as operating parameters through those areas. As shown in FIG. 9, circles 601, 602, 603, 604, 605 may be utilized to denote corners and/or corridors, while lines may be utilized to denote a desired path between those corners and/or corridors. While not shown in FIG. 9, it is to be understood that variations in the lines, circles, or other identifiers could be utilized to denote areas to clean, "move" areas where cleaning is not desired, etc.

As with the method of FIG. 8., the method illustrated in FIG. 9 may be intentionally absent any numerical dimensions, leaving such measurements to the acquisition software of the mobile robotic device 502 as the mobile robotic device 502 executes the defined operation. Thus, the mobile robotic device 502 simply moves along each pre-selected path until it can move no longer (i.e., encountering a wall or other obstacle), at which point the mobile robotic device 502 changes direction and/or operation based on the next selected signifier. Each directional change may be considered to be a waypoint, and this process may be used to generate the waypoints that are used in the cleaning coverage process discussed above in FIG. 7.

In some embodiments, such as that which is shown in FIG. 9, the facility layout 600 may itself be superimposed on the graphical user interface, allowing the operator and/or technician to reference the specific obstacles and areas of the facility when graphically selecting the cleaning path and operational settings. However, in other embodiments, it is to be understood that the graphical user interface may not illustrate the facility specifics, and that the various signifiers (i.e., lines, circles, etc.) are drawn without reference to the specific obstacles, areas, etc. Regardless, because the method does not require numerical dimensions, the mobile robotic device 502 is still able to follow a pre-selected path and operational scheme, even if the various obstacles and areas of travel/cleaning are not represented on the graphical user interface itself. With this configuration, the specific layout of a facility need not be pre-programmed into the device, and the operator and/or technician could provide customized instructions to the mobile robotic device at any time and in any facility. As with the other embodiments described above, these instructions could be deleted after execution of a cleaning route, or could be saved for later use.

Figure 10:
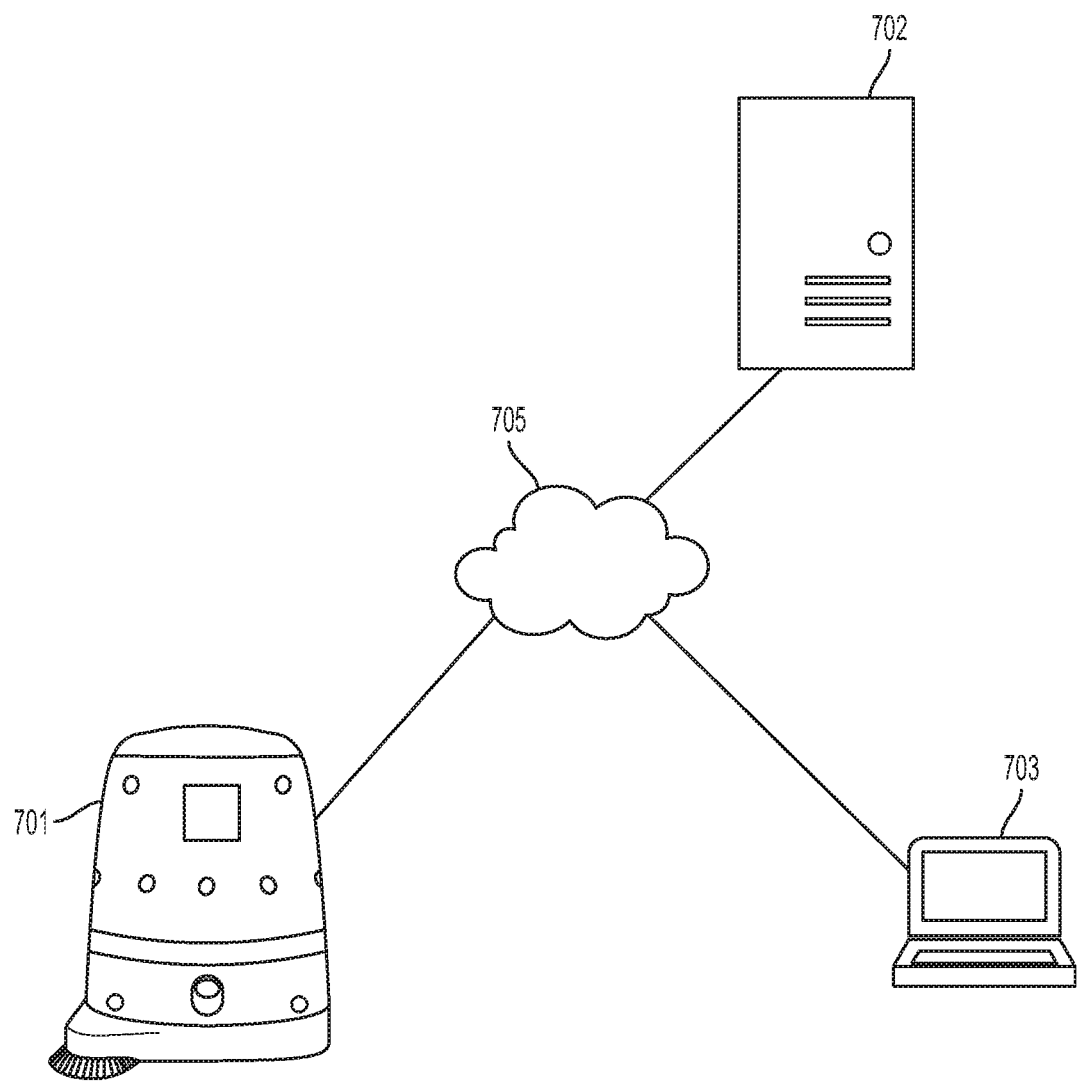
FIG. 10 illustrates a system by which a mobile robotic device may be controlled by a remote server.

Referring to FIG. 10, it is to be understood that any of the processing operations described above may be performed by a robotic device 701 itself, or the robotic device 701 may transmit its sensor data to a remote server 702 or a local electronic device 703 that is in electronic communication with the robotic device 701 via one or more communication networks 705.

Figure 11:
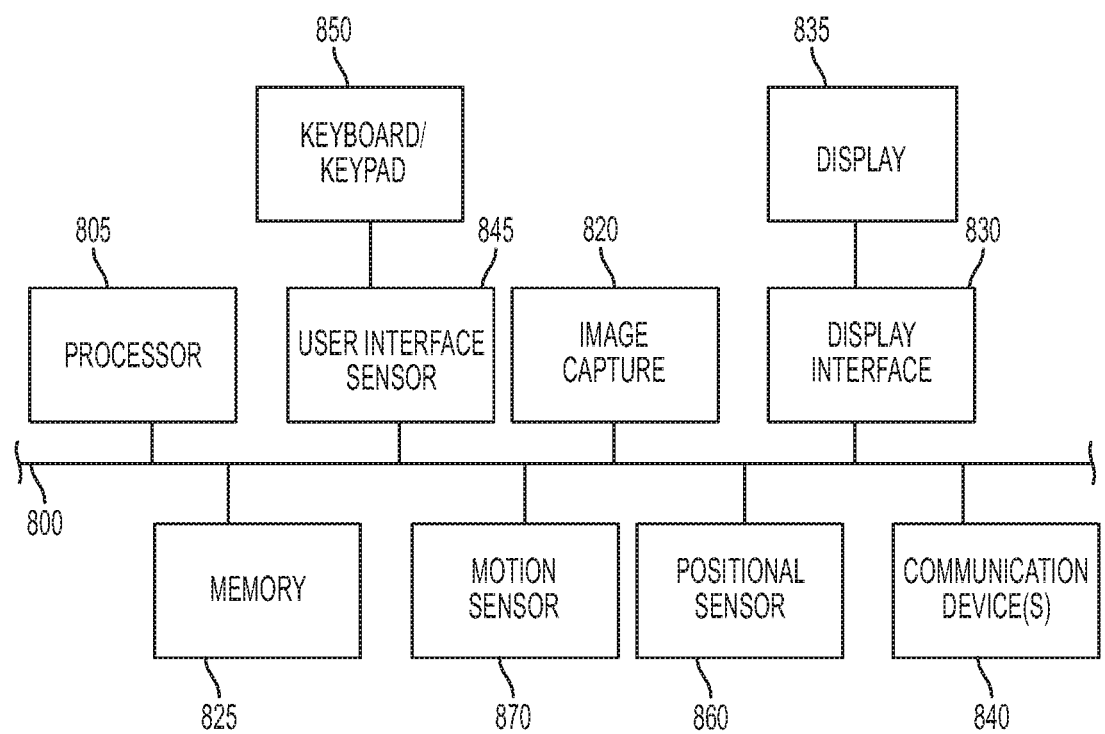
FIG. 11 illustrates example components that may be included in a mobile robotic device or a remote server.

FIG. 11 depicts an example of internal hardware that may be included in any of the electronic components of the system, such as the mobile robotic device or a server that controls the mobile robotic device. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 825. A memory device may include a single device or a collection of devices across which data and/or instructions are stored.

An optional display interface 830 may permit information from the bus 800 to be displayed on a display device 835 in visual, graphic or alphanumeric format. An audio interface and audio output (such as a speaker) also may be provided. Communication with external devices may occur using various communication devices such as a wireless antenna 844, an RFID tag and/or short-range or near-field communication transceiver 842, each of which may optionally communicatively connect with other components of the system. The communication device 840 may be configured to be communicatively attached to a communications network, such as the Internet, a local area network or a cellular telephone data network.

The hardware may also include a user interface sensor 845 that allows for receipt of data from input devices 850 such as a keyboard, a mouse, a joystick, a touchscreen, a touch pad, a remote control, a pointing device and/or microphone. Digital image frames also may be received from a camera 855 that can capture video and/or still images. The system also may include a positional sensor 860 and/or motion sensor 870 to detect position and movement of the device. Examples of motion sensors 870 include gyroscopes or accelerometers. Examples of positional sensors 860 include a GPS sensor device that receives positional data from an external GPS network, and/or the other sensors described above such as a sonar assembly or LIDAR assembly.

The following U.S. patent documents are fully incorporated into this patent document by reference: (1) U.S. Pat. No. 8,958,937, titled "Cleaning Machine with Collision Prevention"; (2) U.S. Pat. No. 8,679,260, titled "Method and System for Movement of an Automatic Cleaning Device using Video Signal"; (3) U.S. Pat. No. 8,532,860, titled "Method and System for Automatic Yield to High Priority Traffic"; and (4) U.S. Pat. No. 8,423,225, titled Method and System for Movement of Robotic Device using Video Signal.

It will be appreciated that the above-disclosed and other features and functions may be combined into many other different systems or applications. All such applications and alternatives are also intended to be encompassed by the disclosure of this patent document.

The invention claimed is:

1. A method of dynamically generating a coverage pattern in an area to be cleaned by a robotic cleaning device, the method comprising:
    moving a robotic cleaning device through the area to be cleaned;
    by a processor, identifying a plurality of consecutive waypoints through the area to be cleaned;
    by the processor, storing the consecutive waypoints in a memory;
    by at least one sensor that is integral with the robotic cleaning device, collecting sensor data about a portion of the area as the robotic cleaning device moves between the consecutive waypoints;
    by the processor, generating a temporary map of the portion of the area between the consecutive waypoints based on the collected sensor data;
    by the processor, using the temporary map of the portion of the area between the consecutive waypoints to generate a cleaning coverage pattern;
    cleaning the area by moving the robotic cleaning device throughout the portion of the area according to the cleaning coverage pattern; and upon completing the cleaning, retaining the consecutive waypoints in the memory while not retaining the temporary map; and
    wherein identifying the consecutive waypoints comprises, by the processor:
        identifying a plurality of locations in the area in which a direction of travel of the robotic cleaning device has changed by at least an angular threshold when the robotic cleaning device is moved through the area; and
    recording each of the identified locations as one of the consecutive waypoints.

2. The method of claim 1, further comprising:
    after completing the cleaning, receiving a new command to clean the area;
    retrieving the consecutive waypoints from the memory;
    by the at least one sensor, collecting new sensor data about an updated portion of the area as the robotic cleaning device moves between the consecutive waypoints;
    by the processor, generating a new temporary map based on the collected new sensor data;
    by the processor, using the new temporary map to generate a new cleaning coverage pattern;
    cleaning the area by moving the robotic cleaning device throughout according to the new cleaning coverage pattern; and
    upon completing the cleaning according to the new cleaning coverage pattern, continuing to retain the plurality of consecutive waypoints in the memory while not retaining the new temporary map.

3. The method of claim 1, wherein identifying the consecutive waypoints comprises, by the processor:
    identifying a plurality of locations in which a manually-activated selection is made by an operator when the robotic cleaning device is moved through the area; and
    recording each of the identified locations as one of the consecutive waypoints.

4. The method of claim 1, wherein identifying the consecutive waypoints comprises, by the processor:
    causing the mobile robotic device to move in a first direction until a first location at which a sensor of the mobile robotic device detects that the mobile robotic device cannot continue to move in the first direction without coming within a threshold distance from a first obstacle;
    causing the mobile robotic device to move in a second direction starting at the first location until a second location at which the sensor of the mobile robotic device that the mobile robotic device cannot continue to move in the second direction without coming within the threshold distance from a second obstacle;
    recording the first location and the second location as consecutive waypoints.

5. A method of causing a robotic cleaning device to clean an area, the method comprising:
- moving a robotic cleaning device through the area to be cleaned;
- by a processor, identifying a first waypoint and a second waypoint in the area;
- by the processor, storing the first waypoint and the second waypoint in a memory;
- by the processor, causing the robotic cleaning device to move from the first waypoint to the second waypoint;
- by at least one sensor that is integral with the robotic cleaning device, collecting sensor data about a first portion of the area as the robotic cleaning device moves from the first waypoint to the second waypoint;
- by the processor, generating a temporary map of the first portion of the area based on the collected sensor data;
- by the processor, using the temporary map to generate a cleaning coverage pattern for the first portion of the area;
- by the processor, cleaning the first portion of the area by moving the robotic cleaning device according to the cleaning coverage pattern; and
- upon completing the cleaning of the first portion of the area, retaining the first waypoint and the second waypoint in the memory while not retaining the temporary map; and
- by the processor, identifying a third waypoint in the area to be cleaned;
  - by the processor, storing the third waypoint in the memory;
  - by the processor, determining whether a cleaning operation in the first portion of the area has been completed;
  - when the cleaning operation of the first portion of the area has been completed, by the processor, causing the robotic cleaning device to move from the second waypoint to the third waypoint;
  - by the at least one sensor that is integral with the robotic cleaning device, collecting additional sensor data about an additional portion of the area as the robotic cleaning device moves from the second waypoint and the third waypoint;
  - by the processor, generating an additional temporary map of the additional portion of the area based on the collected additional sensor data;
  - by the processor, using the additional temporary map of the additional portion of the area to generate an additional cleaning coverage pattern for the additional portion of the area;
  - by the processor, cleaning the additional portion of the area according to the additional cleaning coverage pattern; and
  - upon completing the cleaning of the additional portion of the area, retaining the first waypoint, the second waypoint, and the third waypoint in the memory while not retaining the additional temporary map; and
- wherein identifying at least one of the first waypoint, the second waypoint, or the third waypoint comprises, by the processor:
  - recording a location in which a direction of travel of the robotic cleaning device has changed by more than an angular threshold when the robotic cleaning device is moved through the area.

6. A method of dynamically generating a coverage pattern in an area to be cleaned by a robotic cleaning device, the method comprising:
- moving a robotic cleaning device through the area to be cleaned;
- by a processor, identifying a plurality of consecutive waypoints through the area to be cleaned;
- by the processor, storing the consecutive waypoints in a memory;
- by at least one sensor that is integral with the robotic cleaning device, collecting sensor data about a portion of the area as the robotic cleaning device moves between the consecutive waypoints;
- by the processor, generating a map of the portion of the area between the consecutive waypoints based on the collected sensor data;
- by the processor, storing the map in the memory;
- by the processor, using the map of the portion of the area between the consecutive waypoints to generate a cleaning coverage pattern; and
- storing the cleaning coverage pattern in the memory; and
- wherein identifying the consecutive waypoints comprises, by the processor:
- identifying a plurality of locations in the area in which a direction of travel of the robotic cleaning device has changed by more than an angular threshold when the robotic cleaning device is moved through the area; and
- recording each of the identified locations as one of the consecutive waypoints.

7. The method of claim 6, further comprising:
- cleaning the area by moving the robotic cleaning device throughout the portion of the area according to the cleaning coverage pattern; and
- retaining the consecutive waypoints in the memory upon completing the cleaning of the area.

8. The method of claim 7, further comprising retaining the map in the memory for a predetermined period after completing the cleaning of the area.

9. The method of claim 7, further comprising:
- after completing the cleaning, receiving a new command to clean the area;
- retrieving the consecutive waypoints from the memory;
- by the at least one sensor, collecting new sensor data about an updated portion of the area as the robotic cleaning device moves between the consecutive waypoints;
- by the processor, updating the map for the updated portion of the area based on the collected new sensor data;
- by the processor, storing the updated map in the memory;
- by the processor, using the updated map to generate a new cleaning coverage pattern for the updated portion of the area; and
- cleaning the area by moving the robotic cleaning device throughout according to the new cleaning coverage pattern.

10. The method of claim 9, further comprising continuing to retain the plurality of consecutive waypoints in the memory upon completing the cleaning according to the new cleaning coverage pattern.

11. The method of claim 10, further comprising deleting the new map from the memory upon completing the cleaning according to the new cleaning coverage pattern.

12. The method of claim 10, further comprising retaining the new map in the memory for a period after completing the cleaning of the area according to the new cleaning coverage pattern.

13. The method of claim 6, wherein moving the robotic cleaning device through an area to be cleaned comprises manually moving the robotic cleaning device along a desired path through the area to be cleaned.

14. The method of claim 6, wherein identifying the consecutive waypoints comprises, by the processor:
- causing the robotic cleaning device to move in a first direction until a first location at which a sensor of the robotic cleaning device detects that the mobile robotic device cannot continue to move in the first direction without coming within a threshold distance from a first obstacle;
- causing the robotic cleaning device to move in a second direction starting at the first location until a second location at which the sensor of the robotic cleaning device that the robotic cleaning device cannot continue to move in the second direction without coming within the threshold distance from a second obstacle; and
- recording the first location and the second location as consecutive waypoints.

* * * * *